US006624842B2

(12) United States Patent
McLaine et al.

(10) Patent No.: US 6,624,842 B2
(45) Date of Patent: Sep. 23, 2003

(54) METHODS AND APPARATUS FOR THE CREATION AND TRANSMISSION OF 3-DIMENSIONAL IMAGES

(75) Inventors: Raymond McLaine, Westlake Village, CA (US); Charles S. Palm, Westlake Village, CA (US)

(73) Assignee: Diversified Patent Investments, LLC, Melbourne Beach, FL (US)

( * ) Notice: Subject to any disclaimer, the term of this patent is extended or adjusted under 35 U.S.C. 154(b) by 0 days.

(21) Appl. No.: 10/024,004

(22) Filed: Dec. 21, 2001

(65) Prior Publication Data

US 2002/0085089 A1 Jul. 4, 2002

Related U.S. Application Data

(62) Division of application No. 08/883,157, filed on Jun. 26, 1997, now Pat. No. 6,335,755, which is a continuation of application No. 08/335,381, filed on Nov. 3, 1994, now abandoned.

(51) Int. Cl.⁷ ................................................ H04N 7/18
(52) U.S. Cl. ............................. 348/47; 348/42; 348/54; 348/60
(58) Field of Search ....................................... 348/42–60

(56) References Cited

U.S. PATENT DOCUMENTS

| 3,256,776 A | 6/1966 | Land et al. |
| 3,697,675 A | 10/1972 | Beard et al. ................... 348/60 |
| 3,712,119 A | 1/1973 | Cross et al. |
| 3,712,199 A | 1/1973 | Songer, Jr. |
| 4,134,644 A | 1/1979 | Marks et al. |
| 4,236,172 A | 11/1980 | Krasnoperov |
| 4,247,177 A | 1/1981 | Marks et al. |
| 4,310,849 A | 1/1982 | Glass |
| 4,480,263 A | 10/1984 | van Merode |
| 4,620,770 A | 11/1986 | Wexler |
| 4,658,291 A | 4/1987 | Morishita ..................... 348/44 |
| 4,719,482 A | 1/1988 | Hora ............................ 348/52 |
| 4,734,756 A | 3/1988 | Butterfield ................... 348/60 |
| 4,743,965 A | 5/1988 | Yamada |

(List continued on next page.)

FOREIGN PATENT DOCUMENTS

| DE | 3234644 A | 3/1983 |
| EP | 0328357 A2 | 8/1989 |
| GB | 2187912 | 9/1987 |
| JP | 02058493 | 2/1990 |
| WO | WO83/01719 | 5/1983 |

OTHER PUBLICATIONS

Cahen, O. "Les contraintes stéréoscopiques de la télévision en relief*," *Onde Electrique*, vol. 71, No. 1, Jan. 1, 1991, pp. 22–25, XP000207700, *p. 23, paragraph 2.3*.

Franich, R.E.H., et al. "Object–Based Stereoscopic Coding: Vector Field Estimation and Object Segmentation," *Signal Processing: Theories and Applications*, Proceedings of Eusipco., vol. 1, 1994, pp. 155–158, XO000614680.

*Primary Examiner*—Andy Rao
(74) *Attorney, Agent, or Firm*—Allen, Dyer, Doppelt, Milbrath & Gilchrist, P.A.

(57) ABSTRACT

Three-dimensional color images are produced by combining the red image plane from a left color camera and the blue and green image planes from a right color camera. Techniques for compensating for over or underexposure in a particular image plane are deployed as well as techniques for minimizing subjective disturbance when viewing relatively pure color regions of a 3-dimensional image and for transmission of 3-dimensional color television images to users.

12 Claims, 8 Drawing Sheets

U.S. PATENT DOCUMENTS

| | | |
|---|---|---|
| 4,896,210 A | 1/1990 | Brokenshire et al. |
| 4,994,898 A | 2/1991 | Ling et al. .................... 348/44 |
| 4,995,718 A | 2/1991 | Jachimowicz et al. |
| 5,084,763 A | 1/1992 | Naradate et al. .............. 348/42 |
| 5,218,386 A | 6/1993 | Levien |
| 5,220,421 A | 6/1993 | Chassaaing |
| 5,260,773 A | 11/1993 | Dischert ...................... 348/60 |
| 5,264,964 A | 11/1993 | Faris |
| 5,625,408 A | 4/1997 | Matsugu et al. |
| 6,449,005 B1 * | 9/2002 | Faris ........................... 348/57 |

* cited by examiner

METHODS AND APPARATUS FOR THE CREATION AND TRANSMISSION OF 3-DIMENSIONAL IMAGES

This application is a divisional of U.S. patent application Ser. No. 08/883,157, filed Jun. 26, 1997, now U.S. Pat. No. 6,335,755 which is a continuation of U.S. patent application Ser. No. 08/335,381, filed Nov. 3, 1994, now abandoned.

TECHNICAL FIELD

This invention relates generally to the field of image processing and more particularly to the creation, enhancement transmission, and presentation of of 3-dimensional (3-D) images on a 2-dimensional viewing surface.

BACKGROUND ART

Since the invention of the stereoscope in 1847, there has been a desire for emulating the 3-D images of nature instead of being content with two dimensional images which lack realism due to the absence of depth cues. Many techniques have been devised and developed for producing 3-D images, each varying in degree of success and quality of image. These techniques generally belong to two major classes, namely the autostereoscopic imaging class which produces 3-D images which can be viewed freely without spectacles, and the binocular stereoscopic imaging class which produces 3-D images which requires observers to wear spectacles or viewers. Techniques of the later class have been found in 3-D movies of the 1950's and in occasional 3-D image productions such as 3-D comic books.

Color separation of stereo images has been utilized for over fifty years in the production of photographs, 3D movies and the printed page. In prior art devices such as shown in U.S. Pat. No. 3,712,119, stereo images are separated by mutually extinguishing filters such as a blue-green lens filter over one eye and a red filter over the other eye. With this combination, a full true color image is not obtained, and this color combination may cause eye fatigue, and color suppression.

In the prior art an object of a single pure color matching the filter color e.g. red or blue-green, would be transmitted only to one eye and so would not appear in stereo. However, pure colors are rare, and most objects are off-white, or pastel shades and so contain all three primary colors. Thus, most objects will have some component of each color and this enables the separation of right and left stereo images.

Prints, drawings or representation that yield a 3-D image when viewed through appropriately colored lenses are called anaglyphs.

An anaglyph is a picture generally consisting of two distinctly colored, and preferably, complementary colored, prints or drawings. The complementary colors conventionally chosen for commercial printings of comic books and the like are orange and blue-green. Each of the complementary colored prints contains all elements of the picture. For example, if the picture consists of a car on a highway, then the anaglyph will be imprinted with an orange car and highway, and with a blue-green car and highway. For reasons explained below, some or all of the orange colored elements of the picture are horizontally shifted in varying amounts in the printing process relative to their corresponding blue-green elements.

An anaglyph is viewed through glasses or viewers having lenses tinted about the same colors used to prepare the anaglyph (hereinafter, "3-D glasses"). While orange and blue-green lenses are optimally used with an orange and blue-green anaglyph, red and blue lenses work satisfactorily in practice and apparently are conventionally used.

The orange elements in the picture are only seen through the blue lens, the red lens "washing out" the orange elements. For the same reason, the green-blue elements are only seen through the red lens. Hence, each eye sees only one of the two colored pictures. But because the different colored elements are horizontally shifted in varying amounts, the viewer's eyes must turn inward to properly view some elements, and turn outward to properly view others. Those elements for which the eyes turn inward, which is what the viewer does to observe a close object, are naturally perceived as close to the viewer. Elements for which the viewer's eyes turn outward are correspondingly perceived as distant. Specifically, if the blue lens covers the viewer's right eye, as is generally conventional, then any blue-green element shifted to the left of its corresponding orange element appears to the viewer as close. The element appears closer the greater the leftward shift. Conversely, as a green-blue element is shifted only slightly leftward, not at all, or even to the right of its corresponding red element, that element will appear increasingly more distant from the viewer.

In addition to horizontally shifting the element pairs relative to each other, some users of anaglyphy for comic books also vertically shift the element pairs a slight amount relative to each other. Those users believe that the slight vertical shift improves the 3-D effect.

Normally 3-D images appear monochromatic when viewed through 3-D glasses.

Three dimensional techniques are closely related to the psychology and physiology of an observer's cognitive processes. Subtle changes in selection of portions of the spectrum presented to each eye can result in significant changes in the observer's perception. Even when viewing the same 3-dimensional image through the same viewers, different observers may perceive a 3-dimensional image in different ways.

One problem common to most observers arises when viewing a pure red or pure blue region of a 3-dimensional image through red/blue 3-dimensional glasses. In such circumstances, one eye will perceive black and the other eye will perceive nothing. This has a psychological and/or physiological impact on the viewer which most viewers find disturbing.

Further, when observing 3-dimensional images in which the left and right images are captured using complementary filters, the images reproduced in the colors of the filters, and viewed through viewers of the same colors (e.g. red/blue glasses) which separate the images, 3-dimensional images appear only in black and white. That is, color information is lost in the preparation of the 3-dimensional image. This is characteristic of most 3-dimensional images.

When processing color images using computers, it is common to separate an image into (e.g.) red, green and blue image components. Commonly each color component is referred to as an image plane. In the display of color images on a color cathode ray tube it is common to apply information from each color image plane to a respective electron gun of the cathode ray tube.

Normally, in the past, when preparing 3-dimensional motion pictures, the anaglyph frames were prepared in the post production suite.

When color images are captured, it sometimes occurs that one of the colors utilized for representing the image may be overexposed or underexposed as reflected, inter alia, in an inadequate dynamic range for that color. That is, anytime the color appears at all, it appears at maximum value or anytime it appears it appears at some minimum value instead of being spread over the entire dynamic range of representation. This adversely affects the quality of 3-d image produced The prior art generally required complex specialized equipment for the transmission of 3-dimensional images. This inhibited the use of 3-d technology because much capital investment has been devoted to equipment for handling regular 2-dimensional images. It would be desirable to utilize 2-dimensional transmission equipment to produce 3-dimensional images.

DISCLOSURE OF THE INVENTION

Accordingly, one advantage of the invention is the creation of 3-dimensional images which are perceived in color.

Another advantage of the invention is the elimination of the subjective disturbance perceived when either pure red or pure blue portions of an image are viewed.

Another advantage of the invention relates to correcting overexposure or underexposure of a particular color utilized in creation of 3-dimensional images.

Another advantage of the invention is the creation of 3-dimensional moving images on line rather than in the post production suite.

Another advantage of the invention is the transmission of 3-dimensional color television images over existing broadcast and communication facilities in a cost effective manner.

According to the invention, the foregoing and other objects and advantages are obtained by providing a device for making 3 dimensional color images which uses a left and a right color video camera, each of which produces synchronized outputs comprising 3 image planes with each plane corresponding to red, green and blue color information respectively. The red image plane from the left color video camera is combined with the green and blue image planes from the right color video camera to produce a three dimensional output signal. A frame grabber can be used for each color video camera to capture related frames of each color video camera to produce a still three dimensional digital anaglyph of the images captured by the frame grabber.

Another aspect of the invention involves a method for making three dimensional color images of a scene using a left and a right color video cameras and producing an output video signal from each camera having red, green and blue image planes and by providing green and blue image planes from the right color video camera and a red image plane from the left color video camera as the output signal.

Another aspect of the invention relates to apparatus for making three dimensional images using a left and a right video camera each producing an output comprising 3 image planes, each plane corresponding to particular color information. One image plane from one of the left or right video cameras, preferably the red image plane, is replaced with an image plane from the other of the left or right video cameras and the information from two cameras is combined into one or more three dimensional video images.

Another aspect of the invention relates to a method of creating a three dimensional image from two images captured from two different positions by resolving each of the two images into three separate color components and combining one color component from one of the two images with two color components from the other of the two images to create a combined image.

Still another aspect of the invention relates to a method of creating a three dimensional image from two digital images captured from two different positions by resolving each of the two images into separate color planes, and combining one color plane from one of the two images with at least one color planes from the other of the two images to create a combined three dimensional image.

A different aspect of the invention relates to a method and apparatus for making three dimensional images in which a left and a right color video camera each produce an output comprising red, green and blue image planes. Green and blue image planes from the right color video camera and the red image plane from the left color video camera are combined into an output signal. The color value of each pixel of the output signal is monitored and, when the value lacks a first threshold amount of blue or green color or lacks a second threshold amount of red or green color, a quantity of blue and/or green color or a quantity of red and/or green color, respectively, is added to the pixel color value. As a result, information from two color video cameras is combined into three dimensional color video images which are perceived more acceptably when observed through red/blue viewers.

Another aspect of the invention involves method and apparatus for making three dimensional images by using a left and a right color video camera to produce an output comprising red, green and blue image planes respectively. Green and blue image planes from the right color video camera and a red image plane from the left color video camera are combined as an output signal. The color values of each pixel of the output signal is monitored and, when the red value of a number of pixels indicates underexposure or overexposure in red, substituting a brightened value from the green image plane of the left color video camera. As a result, information from two color video cameras is combined into three dimensional color video images which are perceived more acceptably when viewed through red/blue viewers.

The invention also relates to a method and apparatus for broadcasting three dimensional television images by capturing images using a left and a right color television cameras. Each camera produces an output comprising red, green and blue image planes. A signal containing the output from the left color video camera is transmitted using a first television transmitter and a signal containing the output from the right color video camera is transmitted using a second television transmitter. At a receiver, signals from the first and second television transmitters are received and respective outputs comprising the three image planes from the left and right color video cameras, produced. Green and blue image planes from the right color video camera and a red image plane from the left color video camera are combined into an output signal for viewing on a display.

Another aspect of the invention related to a method and apparatus for broadcasting three dimensional television images by producing a color video output comprising red, green and blue image planes from left and a right color video cameras; broadcasting signals containing the output from the right color video camera using a television transmitter; transmitting signals containing the red image plane from the left color video camera over a point to point communications link; and receiving at a receiver the signals from the television transmitter and said signals from the point to point communications link for providing green and blue image planes from the right color video camera and a red image plane from the left color video camera as an output signal to a display for viewing. Thus, information from two color video cameras is combined into three dimensional color video images at a receiver.

Another aspect of the invention includes the computer generation of 3-dimensional anaglyphs. An object is represented in a 3-dimensional representation such as a wire frame generated using a 3-dimensional database. A full color surface can be rendered (applied) on the wire frame. Two different 2-dimensional views of the object are generated from different perspectives, corresponding, in one example, to views from the left and right eyes. The red image plane from the left perspective is combined with the blue-green image planes from the right perspective to create a 3-dimensional anaglyph representation of the object.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects all without departing from the invention. Accordingly, the drawings and description are to be regarded as illustrative in nature and not as restrictive.

BEST MODE FOR CARRYING OUT THE INVENTION

Figure 1:
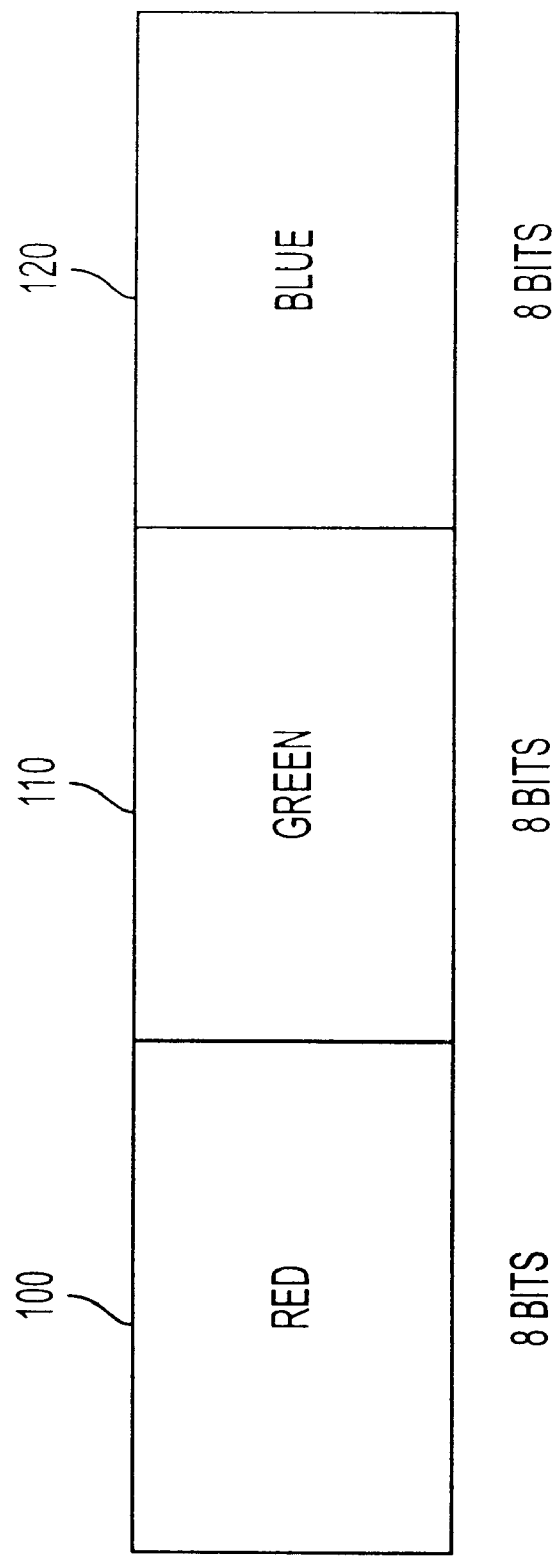
FIG. 1 is an illustration of a common way of storing color pixel information for digital processing in the prior art.

The invention is based in part upon a recognition that color 3-dimensional images can be produced by shifting color plane information. FIG. 1 illustrates how digital color image information for a single pixel may be stored when undertaking digital image processing. Twenty-four bits of information are illustrated in FIG. 1, however, the number of bits per pixel and the number of bits per field may be selected to meet the needs of a particular design. In the example illustrated in FIG. 1, 8 bits are illustrated at 100 represent red information whereas the two sets of 8 bits each at 110 and 120 represents color intensity levels for respective green and blue color components for a particular pixel. With 8 bits each, each indication of color intensity level may represent 256 different intensity levels. The 8 levels in each of 3 colors permits $2^{24}$ color intensity combinations to be represented.

In a typical cathode ray tube (CRT) shadow mask display, separate electron guns are utilized to activate separate red, green and blue phosphor dots on the screen selectively. The red, green and blue bits of the color information depicted in FIG. 1 are utilized to establish the intensity of red, green and blue components or in other words the color for the pixel. If a pure blue pixel were desired, the red and green electron guns would be turned off and only the blue gun would bombard the blue phosphor dot of the triad at an intensity level set by the 8 bit intensity level value for blue (120). If a pure red pixel were desired, the green and blue guns would be turned off by virtue of the 0 values represented in fields 110 and 120 of FIG. 1, and the red gun would be activated at the intensity level set by the 8 bit field 100. For mixed colors, the intensity levels from the three fields 100, 110 and 120 control the color and intensity of the light output from a phosphor dot triad in the CRT screen.

Digital image arrays can be very large. For example, digitizing a fairly standard black and white photographic image can involve a storage requirement of 8 megabits for an array of 1024×1024 elements. This assumes 256 intensity levels. One byte (8 bits) of data is utilized to represent the intensity level of each pixel.

In the example shown in FIG. 1, 8 bits are utilized to represent each color intensity level. Thus a color image of 1024×1024 elements utilizing the storage scheme of FIG. 1, would require 24 megabits of storage. In many applications, even finer resolution is required with the attendant increasing storage overhead.

In the storage of a 1024×1024 color image utilizing the scheme shown in FIG. 1, 8 megabits of information constitutes red only information, a separate 8 megabits of information constitutes green only information and a final 8 megabits of information constitutes blue only information. The aggregation of storage dedicated to particular color information is called a color plane.

The system described above is referred to typically as RGB (red, green, blue) color storage.

Psychologists usually describe color by "hue" the color name which depends on average wave length, by "saturation", the purity of the color, and by "intensity", the overall brightness of the color. Standard formulas are well known in the art for converting between RGB representation and HSL representation.

YIQ coding used in commercial television transmission utilizes a different transformation representation than the HSL system. It requires a luminance component (Y) for monochrome sets and two chromanance components (IQ) which take weighted differences of the RGB values.

Figure 2:
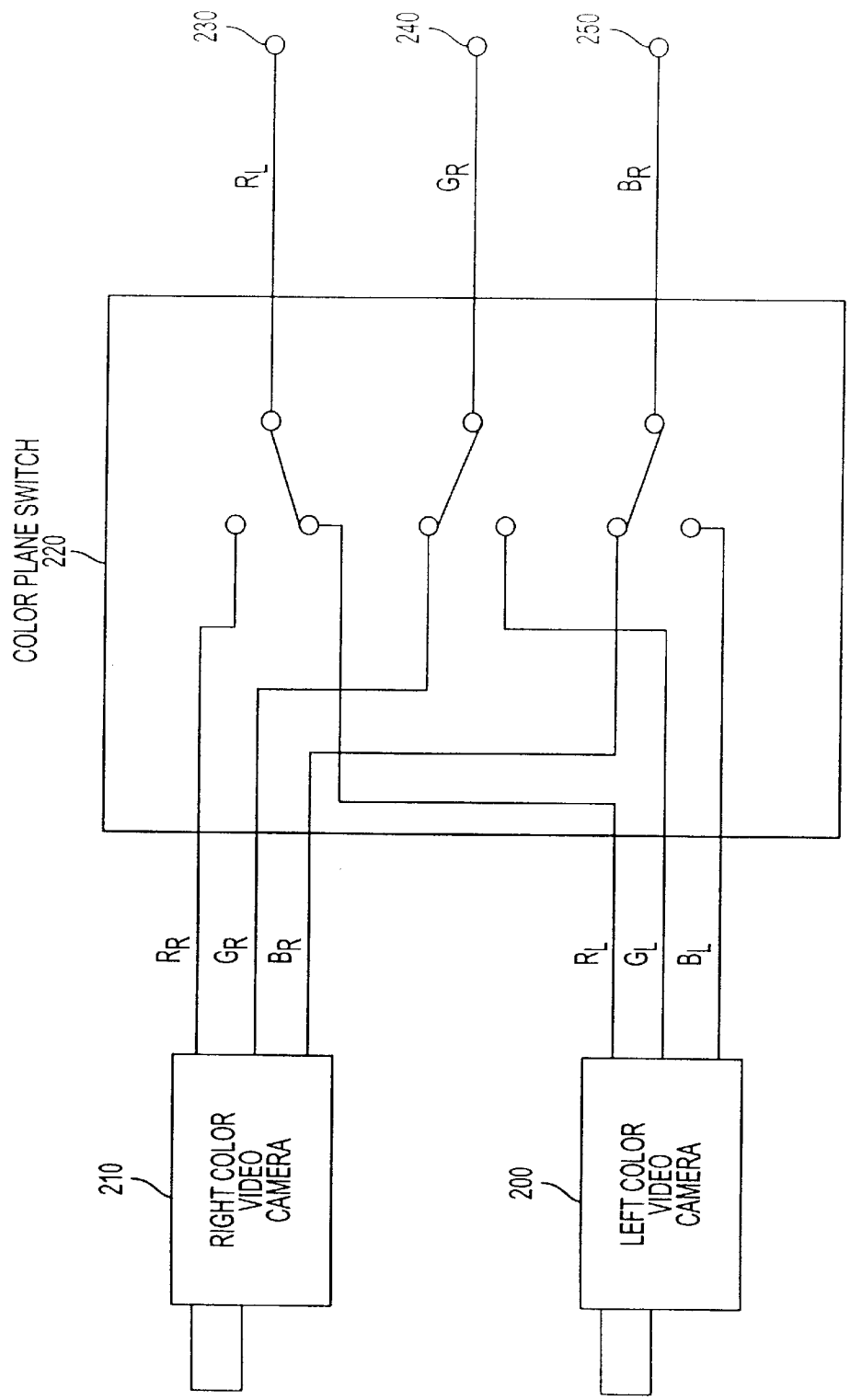
FIG. 2 is an illustration of how image planes from two video cameras can be combined to produce a color 3-d image.

FIG. 2 illustrates a particularly simple technique for generating 3-dimensional images in which the color information is retained. Left and right color video cameras 200 and 210 are positioned so as to capture two different views of the same scene. Preferably, the optical axis of the objective lenses of left and right video cameras 200 and 210 are separated by approximately the interocular distance. Each left and right color video cameras 200 and 210 have respective red, green and blue outputs which are labeled $R_L$, $G_L$ and $B_L$ and $R_R$, $G_R$ and $B_R$, respectively. The red, green and blue outputs from each of the two cameras is fed to color planes switch 220 where the red color plane from the left camera is substituted for the red color plane of the right camera to produce a composite output $R_L$, $G_R$ and $B_R$ at outputs 230, 240 and 250 respectively. If analog, these signals may be sampled directly and stored as separate color planes. If digital, they may be combined into the format shown in FIG. 1. Alternatively, analog output from 230, 240 and 250 may be used to produce a 3-dimensional color video image.

Figure 3:
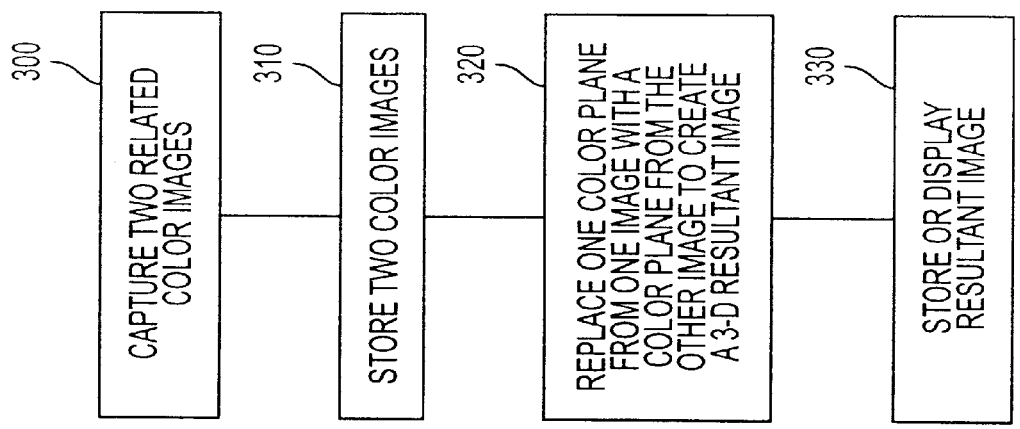
FIG. 3 is a flow chart of image processing required to produce a color 3-dimensional image from two 2-dimensional colored digital images.

FIG. 3 shows a flow chart of image processing required to produce a color 3-dimensional image from two color digital images. First two related color images are captured (300) and optionally stored as two color digital images (310). Then, one color plane from one image is replaced with the color plane from the other image to create a 3-dimensional result in image (320) which can be either stored in an image store or viewed on a display, respectively (330).

Figure 4:
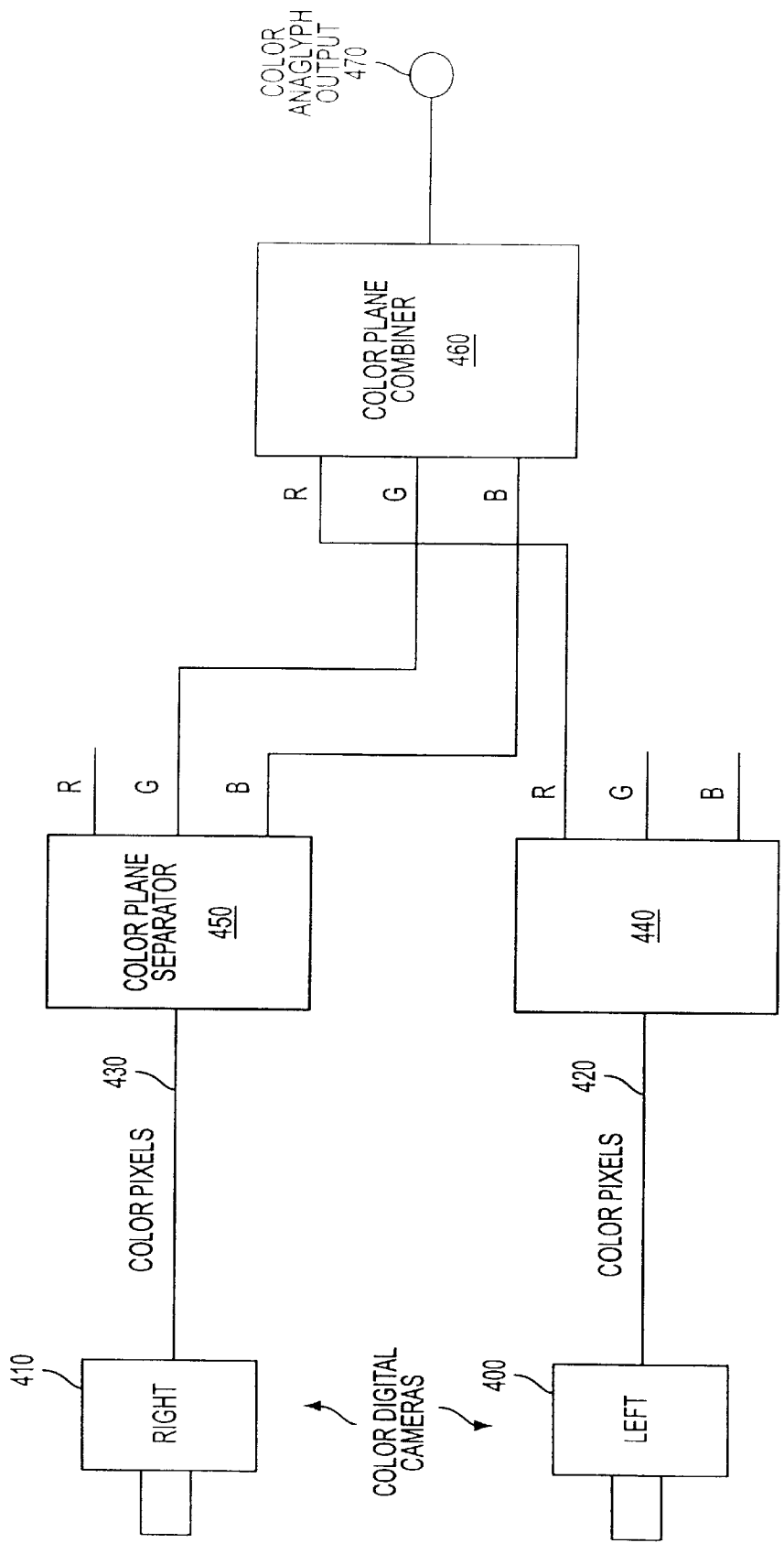
FIG. 4 is a drawing illustrating the creation of a 3-dimensional color still image.

FIG. 4 illustrates how a 3-dimensional color still pictures, or an anaglyphs, may be created. Color digital cameras 400 and 410 capture related still images of a scene to be photographed. Again, it is preferred that the optical axis of the objective lenses of the left and right digital cameras be separated by approximately the interocular distance. Color pixels in digital format are output from cameras 400 and 410 on lines 420 and 430, respectively and are fed to respective color plane separators 440 and 450 respectively. The output of the color plane separators are respectively combined in color plane combiner 460 such that the red image plane from the right camera is replaced with a red image plane from the left camera in color plane combiner 460. The result is an output, 470, which directly produces a color anaglyph of the image captured by the cameras in a particularly simple and efficient manner.

FIG. 4 also illustrates the computer generation of 3-dimensional anaglyphs. An object is represented in a 3-dimensional representation such as a wire frame generated using a 3-dimensional database. A full color surface can be rendered (applied) on the wire frame. Two different 2-dimensional computer generated views of the object are created from different perspectives, corresponding to views from the left and right cameras shown in FIG. 4. The red image plane from the left perspective is combined with the blue-green image planes from the right perspective to create a 3-dimensional anaglyph representation of the computer generated object.

Figure 5:
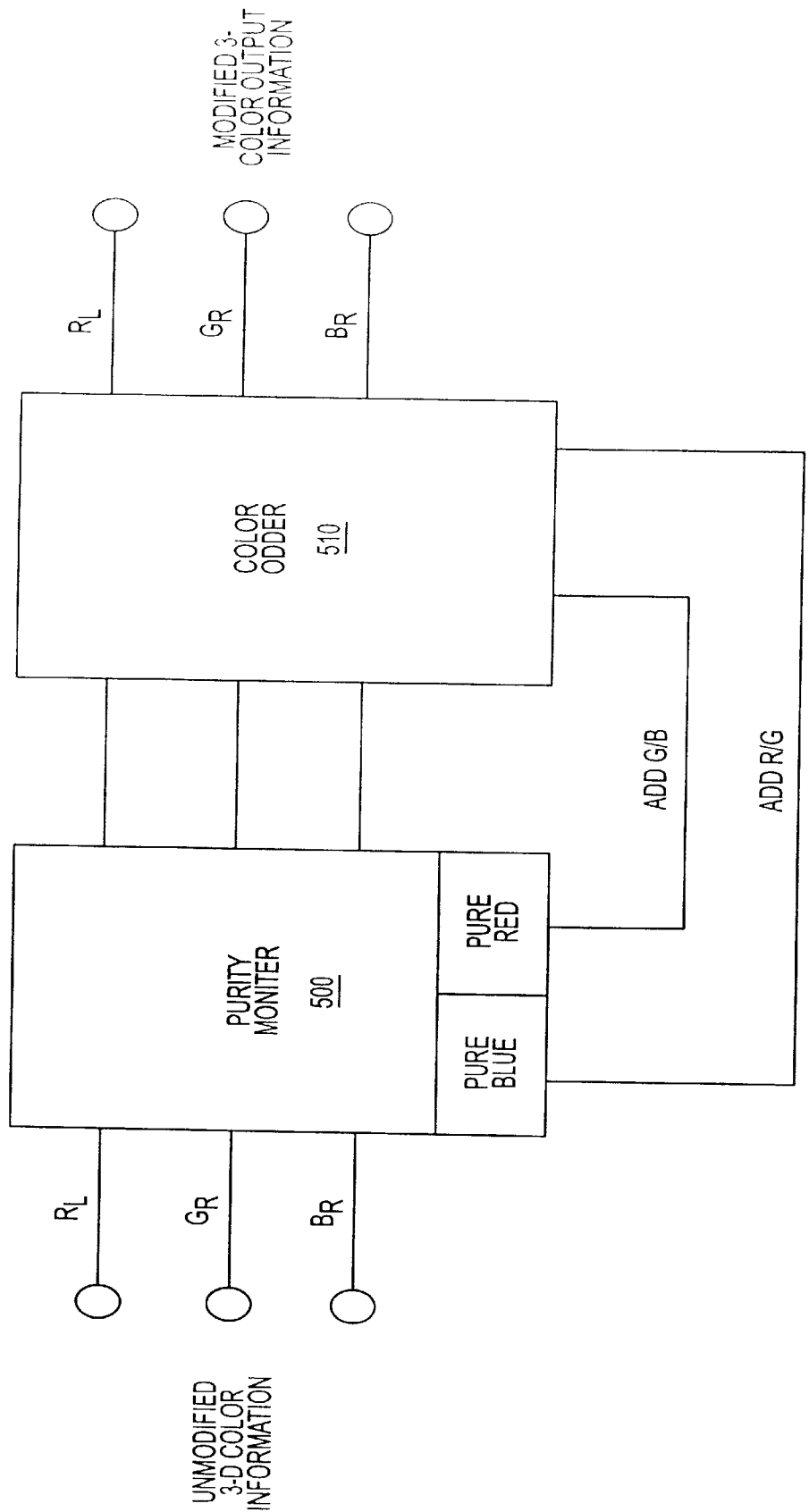
FIG. 5 is a functional illustration of how 3-dimensional color image data is processed to achieve a more pleasing color presentation.

FIG. 5 is an illustration of functionality utilized to eliminate the disturbing effects of viewing pure blue or pure red colors through red/blue viewers. The unmodified 3-D color information such as produced at the output of the FIG. 2 circuitry, is applied at the input purity monitor 500. Purity monitor 500 monitors color plane information and detects when a pixel is either pure blue or pure red within certain tolerances. If a pure red pixel is detected, a certain quantity of green/blue information is added by color adder 510. Similarly, if a pure blue pixel is detected, a certain amount of red/green information is added. The net result is to eliminate pure red or pure blue pixels and the psychological/physiological disturbances that come from viewing such pixels with red/blue viewers. The modified 3-D color output information from color adder 510 has somewhat more muted color information, but the overall subjective viewing quality is improved by the processing illustrated in FIG. 5.

Figure 6:
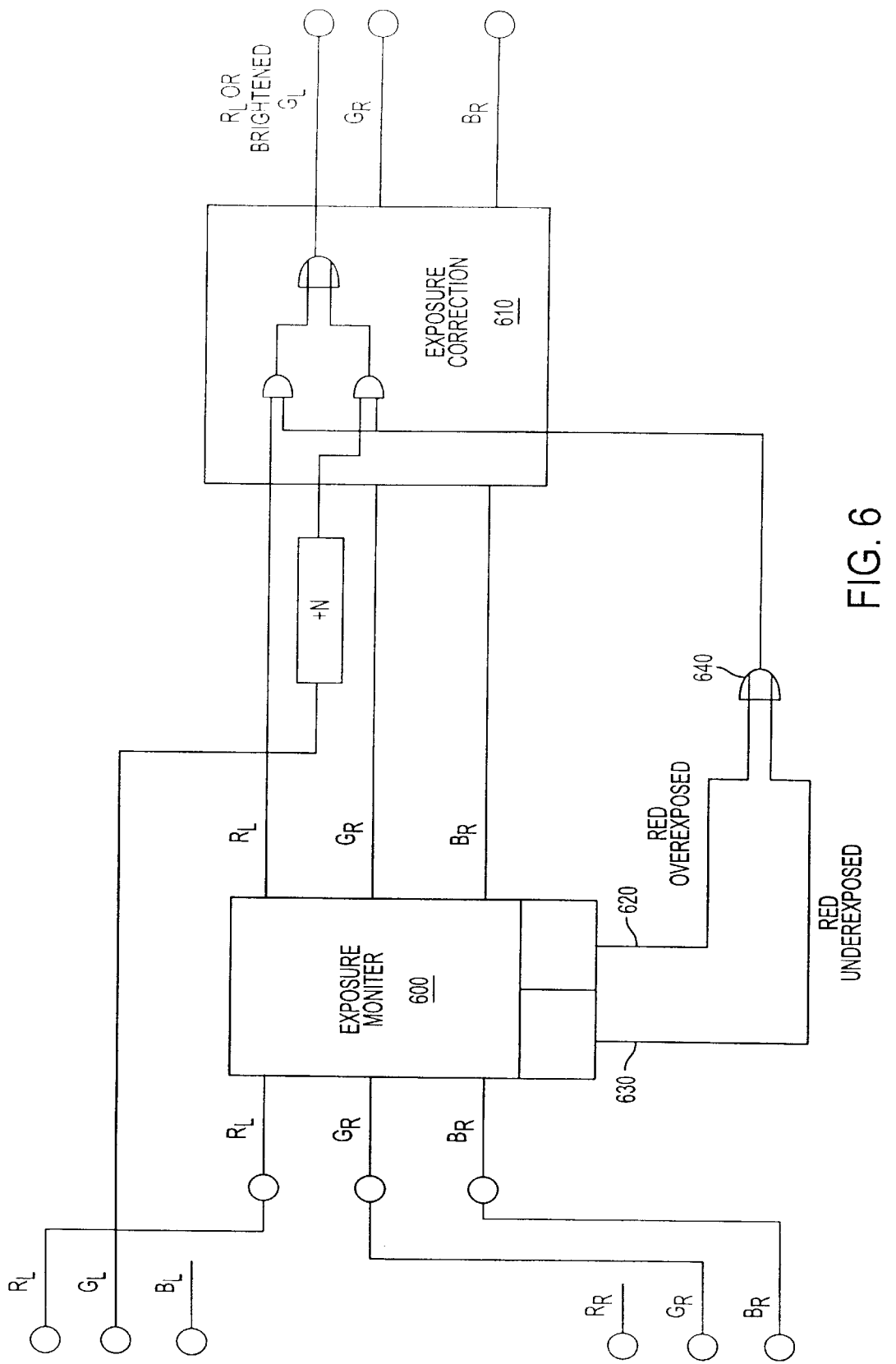
FIG. 6 is a functional depiction of how over- or under-exposure of an image plane can be corrected.

FIG. 6 is a functional illustration of correction of over-exposure or underexposure in a particular image plane. The inputs to exposure monitor 600 are unmodified 3-dimensional color information such as that generated by the circuitry of FIG. 2. Since red over-or-under-exposure has a significant impact on 3-dimensional image color quality, FIG. 6 illustrates monitoring of the red color plane for under or overexposure. Exposure monitor 600 detects over or underexposure by essentially creating a histogram of the red color values being received by the exposure monitor. If most color values are at the high end, red is likely over-exposed. If most values are at the low end, red is likely underexposed. When such a circumstance is detected, exposure correction circuit 610 responds by substituting a brightened version of the green image plane from the same camera from which the red image plane originated for the over or underexposed red image plane.

Exposure monitor 600 periodically samples the incoming values from the red image plane and counts the number of pixels at each level of intensity. At the end of the sampling duration, the number of samples at each of the upper and lower ends of the red color value are examined to determine whether an inordinate percentage of color values fall at those extremes. If the number of pixels at either extreme is inordinately high, then output signal 620 or 630 is generated as appropriate. These two output signals are OR'd in gate 640 and control an electronic switch which replaces the red image plane with a brightened version of the green image plane from the same camera which originated the red image plane. Such brightening occurs by incrementing the green intensity level by "N" steps.

Thus, intervals of under or over-exposure of the red image plane can be corrected to provide a pleasing color 3-dimensional image to the viewer.

Figure 7:
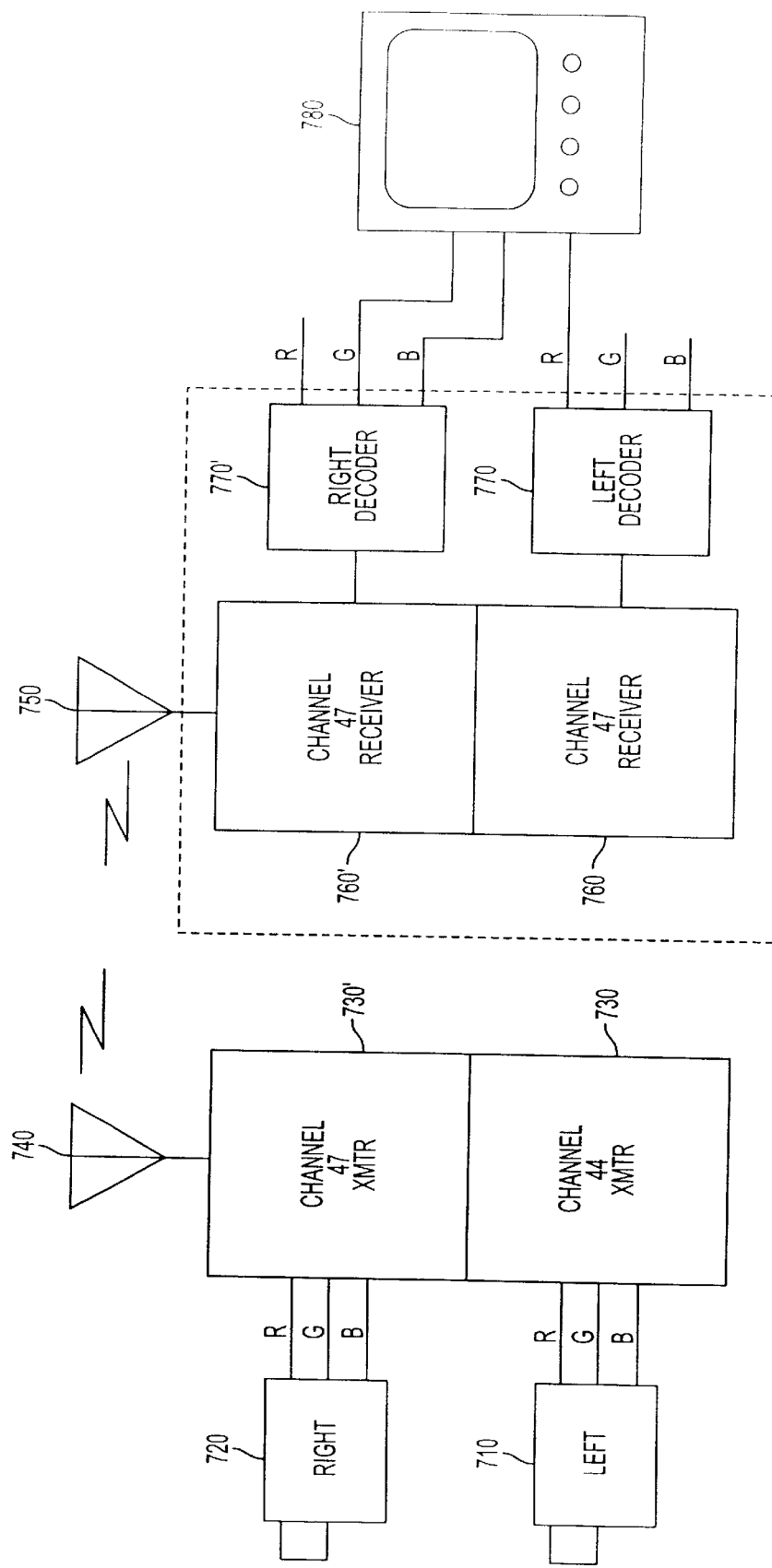
FIG. 7 is a block diagram of a system for transmitting and receiving 3-dimensional television images.

FIG. 7 illustrates a technique for transmitting 3-dimensional images to a viewer utilizing standard television broadcasting equipment. The color video cameras 710 and 720 capture the left and right views respectively of a scene to be transmitted. The RGB output from camera 710 and 720 are fed to respective color television transmitters 730 and 730' which transmit on separate television broadcast channels. Although a single antenna 740 is shown for these transmitters, each transmitter may have its own separate antenna and, in fact, each transmitter may be located at a separate physical location. Images from the two transmitters are received at antenna 750 and fed to receivers 760 and 760' where the RF information is converted to color video baseband in decoder 770 and 770' and synchronized RGB outputs are provided by the decoders. Receivers 760 and 760' may have individual antennas instead of a common antenna 750 as shown. The RGB outputs of the decoder 770 and 770' are connected as shown so that the red image plane is taken from the left decoder and the green and blue image planes are taken from the right decoder and the RGB information is applied to a display such as television set 780. Alternatively, the full left and right images could be applied to left and right displays of a virtual reality viewer, where the left eye would see the full left image and the right eye, the full right image.

Thus, using two channels of normal broadcast television equipment one can create 3-dimensional color television at a user location.

Figure 8:
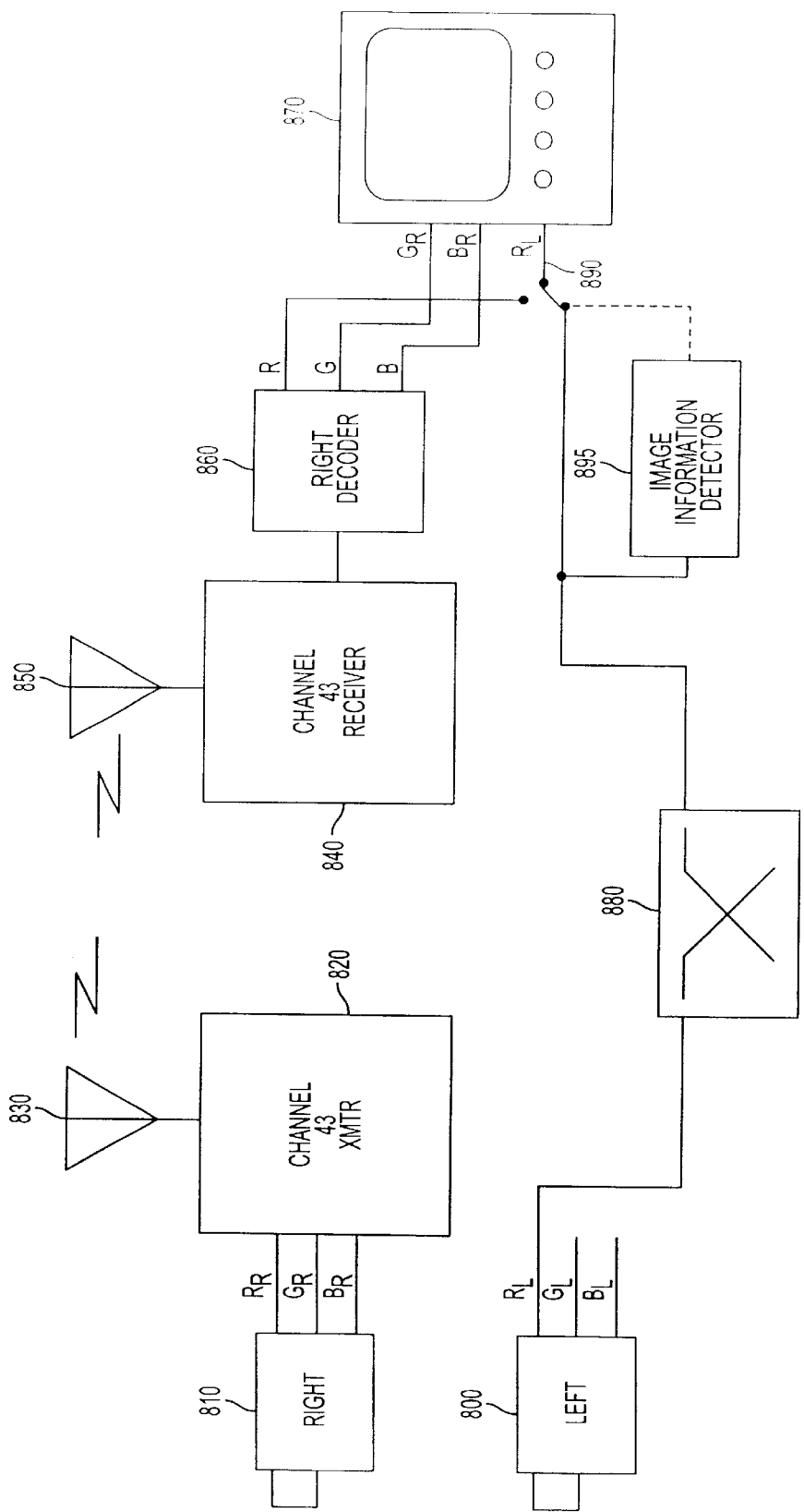
FIG. 8 is a block diagram of another system for transmitting and receiving 3-dimensional television images.

FIG. 8 is an illustration of another method of providing 3-dimensional color television images to a user. One color camera 810 captures a scene normally and its color output is broadcast over color television transmitter 820 and antenna 830 to a receiving antenna 850 and a receiver 840 tuned to the channel. Right decoder 860 produces RGB output from the signal received by the receiver and the green and blue image planes are connected to the display of television set 870. The red image plane from left camera 800 is transmitted over a point to point communication link represented by network 880 to the viewer's location where it may be combined with synchronized green and blue image planes from the right decoder 860 to produce a 3-dimensional image on the display of television receiver 870. A simple switch 890 allows a user to switch between normal color television reception and 3-dimensional color television reception. In normal mode all three image planes from right decoder 860 are fed to color television display 870. In 3-dimensional color television mode, a user might dial up the video information provider over network 880 and request 3-dimensional service. The video information provider would then allow, after suitable arrangements for compensation have been made, the user to download the red image plane of the left camera 800 to complete the 3-dimensional image. The presence of 3-dimensional image data on the point to point communications link can be detected automatically and utilized to control switch 890 so that 3-dimensional information is displayed when 3-dimensional information is available and otherwise 2-dimensional information is displayed.

Accordingly, there have been described methods and apparatus for the creation and transmission of 3-dimensional color images which overcome the problems of the prior art. In this disclosure, there has been shown and described only the preferred embodiment of the invention, but, as aforementioned, it is to be understood that the invention is capable of use in various other combinations and environments. It is capable of changes or modifications within the scope of the inventive concept as expressed herein.

What is claimed is:

1. Apparatus for making three dimensional images comprising:
   a. a left and a right color video camera each producing an output comprising 3 image planes each plane corresponding to red, green and blue color information respectively,
   b. means for providing green and blue image planes from one of the left or right color video camera and a red image plane from the other color video camera as an output signal, and
   c. means for monitoring the color value of each pixel of the output signal and, when the value lacks a first threshold amount of blue or green color or lacks a second threshold amount of red or green color, adding a quantity of blue and/or green color or a quantity of red and/or green color, respectively, to the pixel color value,
   whereby information from two color video cameras is combined into three dimensional color video images which are perceived more acceptably when viewed through red/blue viewers.

2. A method for making three dimensional color images of a scene comprising:
   a. capturing said scene using a left and a right color video cameras;
   b. producing an output video signal from each camera comprising 3 image planes, each plane corresponding to red, green and blue color information respectively;
   c. producing a three dimensional output signal by providing green and blue image planes from one of the left or right color video cameras and a red image plane from the other color video camera as the output signal; and
   d. monitoring the color value of each pixel of the output signal and, when the value lacks a first threshold amount of blue or green color or lacks a second threshold amount of red or green color, adding a quantity of blue and/or green color or a quantity of red and/or green color, respectively, to the pixel color value;
   whereby information from two color video cameras is combined into three dimensional color video images which are perceived more acceptably when viewed through red/blue viewers.

3. Apparatus for making three dimensional images comprising:
   a. a left and a right color video camera each producing an output comprising 3 image planes each plane corresponding to red, green and blue color information respectively,
   b. means for providing green and blue image planes from one of the left or right color video cameras and a red image plane from the other color video camera as an output signal, and
   c. means for monitoring the color values of each pixel of the output signal and, when the red value of a number of pixels indicates underexposure or overexposure in red, substituting a brightened value from one of the green or blue image planes of the camera used to create the red image for the corresponding values in the red image plane used to create the output signal,
   whereby information from two color video cameras is combined into three dimensional color video images which are perceived more acceptably when viewed through red/blue viewers.

4. A method for making three dimensional color images of a scene comprising:
   a. capturing said scene using a left and a right color video cameras;
   b. producing an output video signal from each camera comprising 3 image planes, each plane corresponding to red, green and blue color information respectively;
   c. producing a three dimensional output signal by providing green and blue image planes from one of the left or right color video cameras and a red image plane from the other color video camera as the output signal; and
   d. monitoring the color values of each pixel of the output signal and, when the red value of a number of pixels indicates underexposure or overexposure in red, substituting a brightened value from one of the green or blue image planes of the camera used to create the red image plane for the corresponding values in the red image plane used to create the output signal,
   whereby information from two color video cameras is combined into three dimensional color video images which are perceived more acceptably when viewed through red/blue viewers.

5. Apparatus for broadcasting three dimensional television images comprising:
   a. a left and a right color video camera each producing an output comprising three image planes, each plane corresponding to red, green and blue color information respectively,
   b. a first television transmitter for broadcasting a signal containing the output from the left color video camera,
   c. a second television transmitter for broadcasting a signal containing the output from the right color video camera,
   d. receiving means for receiving signals from the first and second television transmitters, and for reproducing outputs comprising the three image planes from the left and right color video cameras, respectively,
   e. means for providing green and blue image planes from one of the left or right color video cameras and a red image plane from the other color video camera as an output signal to a display for viewing,
   whereby information from two color video cameras is broadcast and combined into three dimensional color video images at a receiver.

6. A method for broadcasting three dimensional television images comprising:
   a. capturing images using a left and a right color television camera each producing an output comprising three image planes, each plane corresponding to red, green and blue color information respectively;
   b. broadcasting a signal containing the output from the left color video camera using a first television transmitter;
   c. broadcasting a signal containing the output from the right color video camera using a second television transmitter;
   d. receiving signals at a receiver from the first and second television transmitters and reproducing respective outputs comprising the three image planes from the left and right color video cameras, respectively; and
   e. providing green and blue image planes from one of the left or right color video cameras and a red image plane from the other color video camera as an output signal to a display for viewing;
   whereby information from two color video cameras is broadcast and combined into three dimensional color video images at a receiver.

7. Apparatus for broadcasting three dimensional television images comprising:
   a. a left and a right color video camera each producing an output comprising three image planes, each plane corresponding to red, green and blue color information respectively,
   b. a television transmitter for broadcasting signals containing the output from one of the left or right color video cameras,
   c. means for transmitting signals containing the red image plane from the other color video camera over a point to point communications link,
   d. receiving means for receiving said signals from the television transmitter and said signals from said communications link for providing green and blue image planes from the one color video camera and a red image plane from the other color video camera as an output signal to a display for viewing,
   whereby information from two color video cameras is combined into three dimensional color video images at a receiver.

8. A method for broadcasting three dimensional television images comprising:
   a. producing a color video output comprising three image planes, each plane corresponding to red, green and blue color information, respectively, from a left and a right color video cameras;
   b. broadcasting signals containing the output from one of the left or right color video cameras using a television transmitter;
   c. transmitting signals containing the red image plane from the other color video camera over a point to point communications link;
   d. receiving at a receiver the signals from the television transmitter and said signals from the point to point communications link for providing green and blue image planes from the one color video camera and a red image plane from the other color video camera as an output signal to a display for viewing;
   whereby information from two color video cameras is combined into three dimensional color video images at a receiver.

9. Apparatus for making three dimensional images comprising:
   a. a left and right color video camera each producing an output comprising 3 image planes each plane corresponding to red, green and blue color information respectively,
   b. a mechanism for providing green and blue image planes from on of the left or right color video camera and a red image plane from the other color video camera as an output signal, and
   c. A monitor for monitoring the color value of each pixel of the output signal and, when the value lacks a first threshold amount of blue or green color or lacks a second threshold amount of red or green color, adding a quantity of blue and/or green color or a quantity of red and/or green color, respectively, to the pixel color value,
   whereby information from two color video cameras is combined into three dimensional color video images which are perceived more acceptably when viewed through red/blue viewers.

10. Apparatus for making three dimensional images comprising:
    a. a left and right color video camera each producing an output comprising 3 image planes each plane corresponding to red, green and blue color information respectively,
    b. a mechanism for providing green and blue image planes from one of the left or right color video cameras and a red image plane from the other color video camera as an output signal, and c. A monitor for monitoring the color values of each pixel of the output signal and, when the red value of a number of pixels indicates underexposure or overexposure in red, substituting a brightened value from one of the green or blue image planes of the camera used to create the red image for the corresponding values in the red image plane used to create the output signal,
    whereby information from two color video cameras is combined into three dimensional color video images which are perceived more acceptably when viewed through red/blue viewers.

11. A method for broadcasting three dimensional television images comprising:
    a. capturing images using a first and second color television camera each producing an output comprising three image planes, each plane corresponding to red, green and blue color information respectively;
    b. broadcasting a signal containing the output from the first color video camera using a first television transmitter;
    c. broadcasting a signal containing the output from the second color video camera using a second television transmitter;
    d. receiving signals at a receiver from the first and second television transmitters and reproducing respective outputs comprising the three image planes from the first and second color video cameras, respectively; and
    e. providing green and blue image planes from one of the first or second color video cameras and a red image plane from the other color video camera as an output signal to a display for viewing;
    whereby information from two color video cameras is broadcast and combined into three dimensional color video images at a receiver.

12. Apparatus for broadcasting three dimensional television images comprising:
   a. a left and right color video camera each producing an output comprising three image planes, each plane corresponding to red, green and blue color information respectively,
   b. a television transmitter for broadcasting signals containing the output from one of the left or right color video cameras,
   c. a point to point communications link for transmitting signals containing the red image plane from the other color video camera
   d. receiving means for receiving said signals from the television transmitter and said signals from said communications link for providing green and blue image planes from the one color video camera and a red image plane from the other color video camera as an output signal to a display for viewing, whereby information from two color video cameras is combined into three dimensional color video images at a receiver.

* * * * *

UNITED STATES PATENT AND TRADEMARK OFFICE
CERTIFICATE OF CORRECTION

PATENT NO. : 6,624,842 B2
DATED : September 23, 2003
INVENTOR(S) : Raymond McLaine and Charles S. Palm It is certified that error appears in the above-identified patent and that said Letters Patent is hereby corrected as shown below:

Column 9,
Line 48, delete "cameras;" insert -- camera; --

Column 10,
Line 26, delete "cameras;" insert -- camera; --

Column 11,
Line 22, delete "broadcast" insert -- broadcasted --
Line 51, delete "cameras;" insert -- camera; --

Column 12,
Line 8, delete "on of" insert -- one of --
Line 12, delete "A monitor" insert -- a monitor --
Line 32, delete "an output signal, and c. A monitor for monitoring the" insert
-- an output signal, and --
Line 33, delete "color values of each pixel of the output signal and," insert -- c. a
monitor for monitoring the color values of each pixel of the output signal and, --
Line 66, delete "broadcast" insert -- broadcasted --

Signed and Sealed this

Second Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,624,842 B2
DATED : September 23, 2003
INVENTOR(S) : Raymond McLaine and Charles S. Palm It is certified that error appears in the above-identified patent and that said Letters Patent is hereby corrected as shown below:

Column 1,
Line 14, delete "of of 3-dimensional" insert -- of a 3-dimensional --.

Column 3,
Line 4, delete "3-d image produced The" insert -- 3-D image produced. --.
Line 5, delete "prior art" insert -- The prior art --.
Line 9, delete "3-d technology" insert -- 3-D technology --.
Line 33, delete "3 dimensional" insert -- 3-dimensional --.
Line 47, delete "cameras and" insert -- camera and --.

Column 4,
Line 41, delete "cameras." insert -- camera. --.
Line 57, delete "planes from left" insert -- planes from a left --.
Line 58, delete "cameras;" insert -- camera; --.

Column 5,
Line 30, delete "3-d" insert -- 3-D --.

Column 9,
Line 48, delete "cameras;" insert -- camera; --.

Column 10,
Line 26, delete "cameras;" insert -- camera; --.

Column 11,
Line 22, delete "broadcast" insert -- broadcasted --.
Line 51, delete "cameras;" insert -- camera; --.

UNITED STATES PATENT AND TRADEMARK OFFICE
CERTIFICATE OF CORRECTION

PATENT NO. : 6,624,842 B2
DATED : September 23, 2003
INVENTOR(S) : Raymond McLaine and Charles S. Palm It is certified that error appears in the above-identified patent and that said Letters Patent is hereby corrected as shown below:

Column 12,
Line 8, delete "on of" insert -- one of --.
Line 12, delete "A monitor" insert -- a monitor --.
Line 32, delete "an output signal, and c. A monitor for monitoring the" insert
-- an output signal, and --.
Line 33, delete "color values of each pixel of the output signal and," insert -- c. a monitor for monitoring the color values of each pixel of the output signal and, --.
Line 66, delete "broadcast" insert -- broadcasted --.

This certificate supersedes Certificate of Correction issued August 2, 2005.

Signed and Sealed this

Twenty-fifth Day of October, 2005

JON W. DUDAS
*Director of the United States Patent and Trademark Office*